United States Patent

Battu et al.

[11] Patent Number: 5,872,688
[45] Date of Patent: *Feb. 16, 1999

[54] MINIATURE HARD DISK DRIVE HAVING LINEAR LOUD-BEAM SUSPENSION AND THIN VOICE COIL MOTOR

[75] Inventors: Ramgopal Battu, Canoga Park; Iraj Jabari, San Jose; Sanjoy Ghose, Santa Cruz, all of Calif.

[73] Assignee: Seagate Technology, Inc., Scotts Valley, Calif.

[*] Notice: The term of this patent shall not extend beyond the expiration date of Pat. No. 5,808,838.

[21] Appl. No.: 835,870

[22] Filed: Apr. 8, 1997

Related U.S. Application Data

[63] Continuation of Ser. No. 181,888, Jan. 14, 1994, abandoned, which is a continuation of Ser. No. 56,984, May 3, 1993, abandoned, which is a continuation of Ser. No. 932,722, Aug. 20, 1992, abandoned, which is a continuation of Ser. No. 807,793, Dec. 12, 1991, abandoned, which is a continuation of Ser. No. 477,747, Feb. 9, 1990, abandoned.

[51] Int. Cl.$^6$ .................................................. G11B 5/54
[52] U.S. Cl. ..................................... 360/106; 360/97.01
[58] Field of Search .................................. 360/105, 106, 360/97.01, 97.02, 98.01, 98.02, 99.01, 104

[56] References Cited

U.S. PATENT DOCUMENTS

| | | | |
|---|---|---|---|
| 4,609,949 | 9/1986 | Kutaragi | 360/27 X |
| 4,689,700 | 8/1987 | Miyake et al. | 360/78.04 |
| 4,875,117 | 10/1989 | Slezak et al. | 360/98.01 |
| 4,881,139 | 11/1989 | Hazebrouck | 360/106 |
| 4,941,062 | 7/1990 | Yoshioka | 360/106 |
| 4,956,733 | 9/1990 | Dalziel | 360/98.01 X |
| 4,965,684 | 10/1990 | Stefansky | 360/97.01 X |
| 4,965,691 | 10/1990 | Iftikar et al. | 360/106 X |
| 4,985,793 | 1/1991 | Anderson | 360/105 |
| 5,025,335 | 6/1991 | Stefansky | 360/97.01 |
| 5,025,336 | 6/1991 | Morehouse et al. | 360/97.01 X |
| 5,034,837 | 7/1991 | Schmitz | 360/106 |

OTHER PUBLICATIONS

PC Week vol. 6, No. 44; Kristina Sullivan; "PrairieTek Planning 2.5 inch Hard Drive for Notebook PC", Nov. 6, 1989.

*Primary Examiner*—Jefferson Evans
*Attorney, Agent, or Firm*—Flehr Hohbach Test Albritton & Herbert LLP

[57] ABSTRACT

The invention is a miniature disc drive system. In the preferred embodiment of the invention, a positioner for positioning a transducer includes an actuator arm having the transducer mounted at one end and a voice coil motor (VCM) mounted at the other end. A pivot is centrally located along the actuator arm, whereby the VCM, when activated, can rotate the transducer over a disc or discs having approximately 45 mm diameters. The VCM is preferably a moving voice coil-type having a voice coil attached to the actuator arm and two magnets positioned above and below the voice coil such that the voice coil can freely move between them. One magnet is mounted to a base portion of a housing which encloses the entire disc drive system. The other magnet is mounted to roof portion of the housing. Thus, the housing is integrated into the active components of the disc drive and permits a significant size reduction to be achieved. Alternatively, a moving magnet VCM can be used, whereby two voice coils are mounted, one each to the roof and the base of the housing, respectively. A permanent magnet is attached to the actuator arm and moves freely between the voice coils. Selective activation of the voice coils rotates the actuator arm and positions the transducer over a desired track of the disc. The housing for both the preferred and alternative embodiments is approximately 50 mm×70 mm×19 mm and each embodiment is capable of storing 10 MB or more of data.

20 Claims, 3 Drawing Sheets

MINIATURE HARD DISK DRIVE HAVING LINEAR LOUD-BEAM SUSPENSION AND THIN VOICE COIL MOTOR

This is a Continuation of application Ser. No. 08/181,888 filed Jan. 14, 1994, now abandoned; which is a Continuation of Ser. No. 08/056,984 filed May 3, 1993, now abandoned; which is a Continuation of Ser. No. 07/932,722 filed Aug. 20, 1992, now abandoned; which is a Continuation of Ser. No. 07/807,793 filed Dec. 12, 1991, now abandoned; which is a Continuation of Ser. No. 07/477,747 filed Feb. 9, 1990, now abandoned.

FIELD OF THE INVENTION

The present invention is directed generally to the field of hard disc drives, and more particularly to miniature Winchester-type hard disc drive systems.

BACKGROUND OF THE INVENTION

With the rapidly expanding development of personal computers into the field of first what were termed portable, then lap-top, and now notebook size computers, there has been a tremendous demand for maintaining the performance of the disc drive systems of such computers. The major development in this direction has been the development of smaller Winchester-type disc drives as replacements and enhancements to floppy disc drives for program storage. The Winchester disc drive, in general, provides higher capacities and faster speeds of operation, factors which are of great importance for the effective use of personal computers running advanced software packages.

The Winchester-type disc drives that have been developed for the personal computer market were initially based on the use of hard discs of a diameter of approximately 5.25 inches. Many of these disc drives used stepper motors for positioning a transducer over a selected track on the rotating disc, although larger capacity systems typically used voice coil motors. The next step in reduction of size of the disc drive was to cut the "form factor" (the dimensions of the external case for the complete disc drive) by one half, so that the resulting disc drive used a platter of 3.5 inch diameter. The height of the disc drive was also becoming a significant factor, and efforts were made to reduce the height of the disc drive as well, so that the size of the casing for the personal computer could be minimized. However, as to most lap-top and notebook computers, hard disc drives continue to be external devices.

SUMMARY OF THE INVENTION

It is an objective of the present invention to provide a compact hard disc drive system having reduced length, width and height dimensions.

Another object of the invention is to provide a compact hard disc drive system which may be inserted and removed from the computer, both to maximize the effectiveness of the disc drive and provide additional storage capacity by interchanging disc drives, as well as to provide for security for the information stored on the disc drive.

A further objective of the present invention is to provide a disc drive which is compatible with the reduced power budget available in a battery-operated portable computer. Typically, portable computers only provide 5V DC, which must be capable of providing sufficient power both to maintain the disc spinning at a constant speed, and powering the motor of the head arm actuator to selectively position the head over a track on the disc and maintain the head position over the target track on the disc.

Another object of the present invention is to utilize a voice coil motor design which is extremely compact yet capable of reliable positioning of the transducer supporting actuator arm relative to the disc on a long-term basis.

Yet another objective of the invention is to provide quick connect/interconnect capability on the outer portions of the head disc assembly to provide a simply-connected interface to the drive control electronics.

The compact Winchester-type disc drive of the present invention was specifically designed to provide a system which will meet the demands of notebook and lap-top size and type computer systems. In a preferred embodiment, the rotating disc dimensions will be 15 mm inside diameter and 45 mm outside diameter.

In the preferred embodiment of the present invention, two hard discs will be provided, although a single hard disc design may also be used. Storage on each disc in excess of 5 megabytes once the discs are formatted is provided. An actuator system supports two read/write heads for each disc, one head positioned on each side of the disc, to write digital information on and read digital information from the disc. A positioning mechanism is provided to move the transducer between the tracks on the discs and for holding the transducer accurately positioned over each track to write information on and read information from the disc.

In a preferred embodiment of the present invention, the actuator includes a rotary voice coil motor, which is arranged to move the transducer along a path extending in an approximately radial direction with respect to the hard disc to move the transducer selectively to any track between the inner diameter of 15 mm and the outer diameter of 45 mm.

Means will be provided for lifting the heads from the disc, comprising either a shape memory metal withdrawal system or a ramp system combined with a head rest area adjacent the outer diameter of the disc in order to provide a very high resistance to non-operating shocks.

By incorporating the features generally outlined above and to be described in further detail below, a disc drive having an overall outer dimension of about 70 mm by about 50 mm, with a thickness of 10 mm can be achieved, wherein the disc inner diameter is 15 mm and outer diameter is 45 mm. In this way, a high compact, easily inserted and removed disc drive is achieved.

DETAILED DESCRIPTION OF A PREFERRED EMBODIMENT

Figure 1:
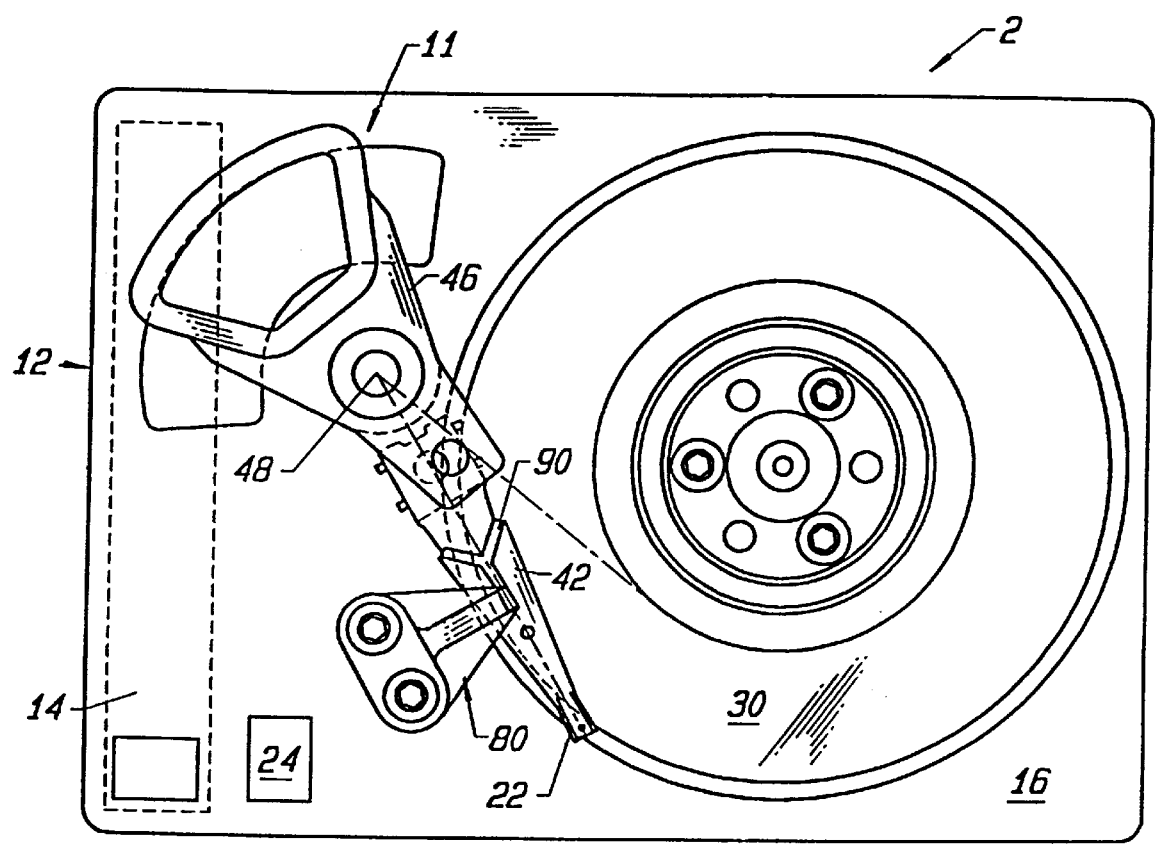
FIG. 1 is a top plan view of the disc drive of this invention.

The compact Winchester disc drive of the present invention is shown in a top plan view (with the cover removed) in FIG. 1 and in a vertical sectional view in FIG. 2. In this figure and in FIG. 2, like components are designated by like reference numerals.

Referring first to FIG. 1, the major elements of the compact disc drive of the present invention are shown, including a housing 2. It is anticipated that the housing may be slid into a slot provided within the computer for the disc drive system. In order to minimize the electronics which must be provided on this very small disc drive, an external connector generally indicated at 12 is provided on the housing wall to the rear of motor 11. A second connector may be provided on the bottom surface 16 of the disc drive to provide additional electrical connections from the disc drive to the electronics which are in turn supported within the computer.

By providing the electrical connectors 12, 14 immediately adjacent the voice coil motor 11 and the leads which run back from the transducer 22, the length of the runs of the wires is minimized. This is important especially with respect to the wire length from the external interconnect 12, 14 to the transducer 22 because the signals picked up from the transducer 22 are relatively weak. In order to amplify these signals, an internal preamplifier 24 may be provided mounted on the baseplate 16 of the housing 2. In this way, the signals picked up from the transducer receive sufficient amplification to be accurately replicated after being transferred over the connecting interfaces 12, 14 to the electronics incorporated in the disc drive.

The drive is mounted in a hard case without external shock mounts. It is anticipated that to accommodate the minimal size of the disc drive, an appropriate mount can be incorporated into the lap-top or notebook size computer with which this disc drive is especially intended to work.

The disc drive system designed in accordance with the preferred embodiment of this invention is a microprocessor-based device which moves the transducer 22 from track to track across the surface of the disc 30 in response to commands received by the microprocessor from the host system on the computer by way of a disc drive controller. The disc drive controller and microprocessor of the present invention are not shown herein, and would be mounted externally to the disc drive and connected by the interface 12 or 14 to the disc drive in order to minimize the parts count supported on the disc drive. Alternatively, certain critical electronic elements of the present invention may be supported from the base 16 of the disc drive internally or externally, provided appropriate shock damping and thermal isolation is utilized.

Figure 2A:
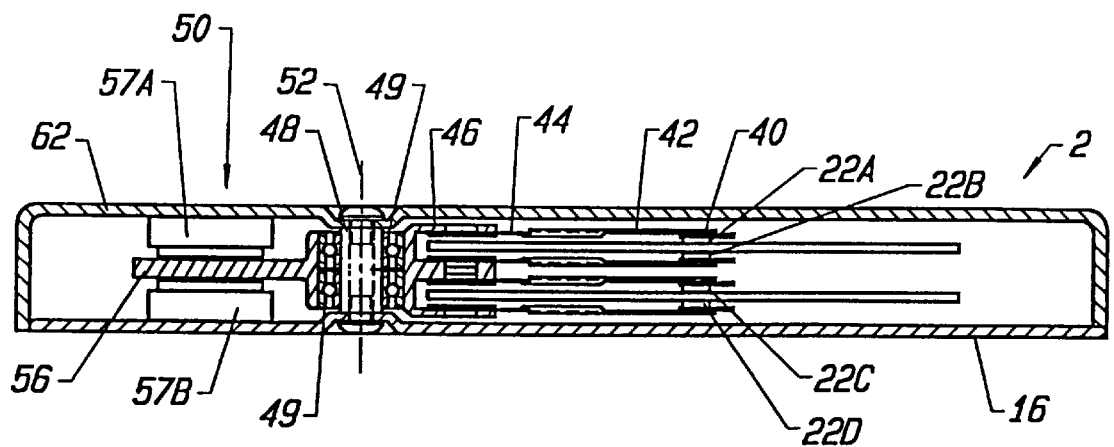
FIGS. 2A and 2B are sectional views of the disc drive of FIG. 1.
Figure 2B:
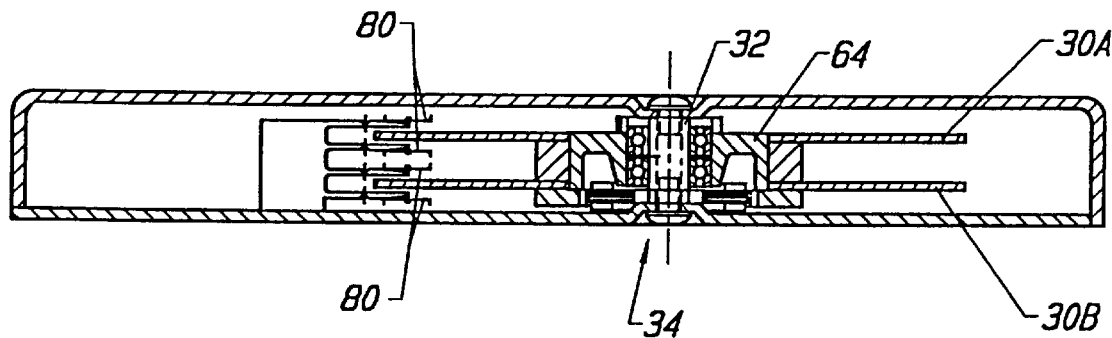

Turning to FIG. 2A, each disc 30A, 30B is mounted within the housing and on the hub of a spindle 32 supported on a spindle motor 34. Each of the discs has an inner diameter of about 15 mm and an outer diameter of about 45 mm, and is from 0.020 inch to 0.025 inch thick. In a preferred embodiment as shown in FIGS. 2A, 2B two discs 30 are supported on the spindle 32, and transducers 22A, B, C, D are provided for reading and writing on both surfaces of each disc. The transducers 22 in a preferred embodiment comprise MR heads of the type made by PCI Components, Inc. of Minneapolis, Minn., and as described in U.S. Pat. No. 7,891,725, issued Jan. 2, 1990, and assigned to the assignee of the present invention.

Each read/write head 22 is mounted on a gimble 40 mounted at one end of a flexure 42, the gimble supporting a 70 percent of normal length slider/gimbal/suspension and a 50 to 70 percent of normal length flexure.

The supported end 44 of each flexure 42 is fastened to arm 46 which is rotated about pivot 48 by voice coil motor 50. The flexure and arm are arranged to provide a straight arm extending from the voice coil motor out to the disc in accordance with the teachings of the Gitzendammer U.S. Pat. No. 4,620,251, assigned to the assignee of the present invention. The supporting arm 46 is supported at pivot 48 on a steel shaft fixed to the races of a pair of ball bearings 49 which are in turn located in the base 16 of the housing 2. The shaft 48 rotates about the axis 52 to quickly and reliably alter the position of the transducers 22A–D relative to the tracks on the disc.

Figure 3:
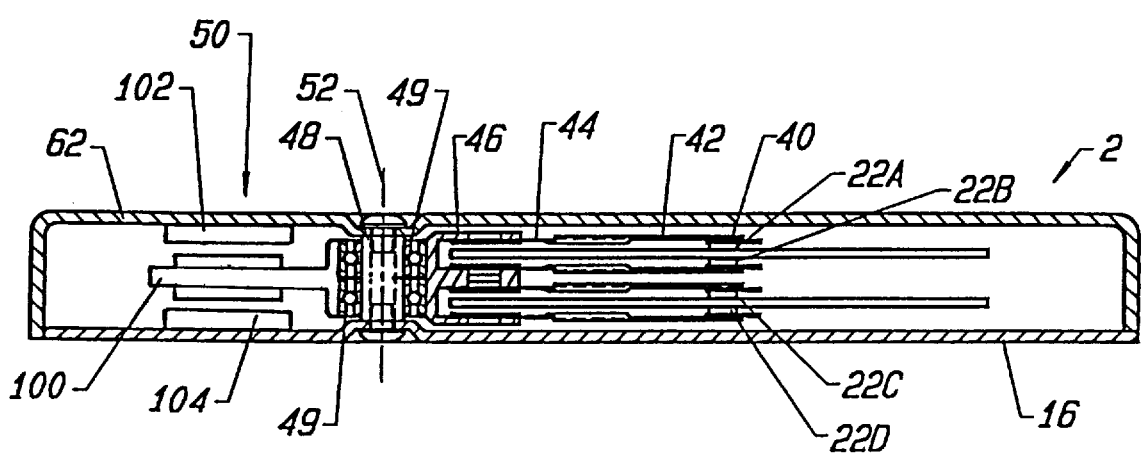
FIG. 3 is a sectional view of an alternative embodiment of the invention.

The voice coil motor 50 in a preferred embodiment comprises a single moving magnet 56 supported on the distal end of the arm 46 from the flexure 42. The single moving magnet motor 50 which comprises in a preferred embodiment a moving magnet and backarm which serves as a balancing counterweight is movable between two coils 57A, B supported above and below the magnet 50. Alternatively, as depicted in FIG. 3, a coil 100 may be supported on the distal end of the arm 46, movable with selective application of current to the coil 100 causing magnetic flux which interacts with the magnetic flux of the upper 102 and lower 104 magnets. In this instance, one of the magnets 104 may be supported from the base casting 16 of the housing, with the other magnet 102 being supported from the upper portion 62 (FIG. 3) of the housing.

Referring next to FIG. 2B, the spindle motor 34 is clearly shown being an in-hub spindle motor which supports the disc on the outer rotating hub 64. To minimize the height of the motor, Hall-less driving circuits of the type disclosed in U.S. Pat. No. 5,001,450, issued Mar. 19, 1991 to A. Cassa, are incorporated in the motor to determine its position and appropriately drive it in the correct direction.

Referring to both FIG. 1 and FIG. 2B, it is important to note that in order to maximize the ability of the system to handle shocks of up to 100 to 150 g's for portable applications, the system is designed to provide for landing the head gimble array on a separate area or ramp 80 adjacent the rotating disc, rather than allowing the head to rest on the disc as in most known smaller disc drives. One approach to achieving this goal is to use a shape memory metal head gimble assembly head lifting wire of the type disclosed in U.S. patent application Ser. No. 299,400, filed Jan. 23, 1989 now U.S. Pat. No. 4,996,617 issued Feb. 26, 1991 (incorporated herein by reference), assigned to the assignee of this invention, wherein a wire would extend down the centerline of the flexure 42 and be attached to a point on the flexure, the wire being shortened in length in response to application of a current to cause the bending of the flexure 42 and to lift the flexure up off the rotating disc surface. Alternatively, an inclined ramp 81 may be utilized cooperating with the flexure 42 and a cam member incorporated as a ridge 90 in flexure 42 so that the flexure and head gimble assembly as it moves horizontally relative to the disc and reaches the edge of the disc, is lifted above the disc unloading the head from the disc even in the absence of rotation of the disc.

The present invention may be embodied in other specific forms without departing from the spirit or essential characteristics of the present invention. The present embodiment is presented merely as illustrative and it is not intended that the invention be limited to the specific example described above and shown in the attached figures. It is believed that by using the combination of features described above, that a compact disc drive having dimensions of approximately 50 mm by 70 mm by 10 to 19 mm high can be achieved which can be driven with only a 5V DC power supply. A sufficient capacity of 10 megabytes or more data storage can be achieved on a 15 mm ID by 45 mm outside diameter by 0.020–0.025 inch thick disc, and reliable positioning of the head relative to the disc can be achieved. The remaining critical dimensions which can be achieved by the novel combination of design features described above is listed below.

pivot/gap=1.040
pivot/head=1.046
gap/head=0.028
pivot/center=1.082
# of TKS=700
R0=0.840
R last_TK=0.495
RPM=3000

The full scope of the present invention is to be limited only by the meaning and range of equivalency of the following claims.

What is claimed is:

1. A computer disc drive system for operating a compact hard disc, said disc drive system comprising:

at least one hard disc having concentric tracks;

means for rotatably supporting said hard disc;

means for rotating said hard disc at constant speed;

transducer means for writing digital information and reading digital information from said hard disc;

positioning means for moving said transducer means between the tracks on said hard disc, said positioning means including an actuator arm having first and second ends and a pivot positioned along a longitudinal axis of said arm between said ends, said transducer means supported at said first end of said arm centered on said longitudinal axis on a gimble mounted on one end of a flexure, said flexure being a straight arm load-beam extending from an attachment point of said flexure to said arm located between said pivot and said arm first end and having a shape in a plane parallel to said disc surface which is substantially symmetrically tapered about said longitudinal axis from a wide portion proximate said first end to a narrow portion proximate said transducer means; and a load spring secured to an end of said straight arm load-beam and a gimble spring secured to the load spring for supporting the transducer, and a voice coil motor having a single selectively energized coil supported at said second end centered on said longitudinal axis of said arm movable between two magnets; said gimble and flexure assembly arranged to provide a straight arm extending from said voice coil motor to said hard disc; and a housing comprising a top portion having a roof portion and side walls mating with a base portion to define a cavity enclosing said at least one hard disc, said means for rotatably supporting said hard disc, means for rotating said hard disc, said transducer means and said positioning means; said housing having one of said positioning means magnets mounted directly to said base portion and the other of said magnets mounted directly to said roof portion, the overall dimensions of said housing being substantially 70 mm by substantially 50 mm with a thickness of substantially 10 mm, and wherein the transducer means are selectively positionable over tracks on said disc;

said voice coil motor having a compact design having a reduced thickness in which said first and second magnets are mounted directly to the roof and base portions of said housing in which the said or each disc supporting means, transducer means and positioning means are disposed, and are contained entirely within said housing, so that the overall external thickness of said housing in a direction parallel to said pivot in the region containing said voice coil motor is substantially the combined thicknesses of only said magnets, said coil, said housing roof, said housing base, and air gaps between said magnets and said coil.

2. A disc drive as claimed in claim 1 including an external connector on the upright sidewall of said housing adjacent said voice coil motor, and a second electronic connector on outer portion of the base of said housing extending underneath said voice coil motor, said external upright connector on said upright sidewall permitting the disc drive to be easily inserted and withdrawn from a computer in which the disc drive is to be used.

3. A computer disc drive system for operating a compact hard disc, said disc drive system comprising at least one hard disc having concentric tracks, means for rotatably supporting said hard disc, means for rotating said hard disc at constant speed, transducer means for writing digital information and reading digital information from said hard disc;

positioning means for moving said transducer means between the tracks on said hard disc said positioning means including an actuator arm having first and second ends and a pivot positioned along a longitudinal axis of said arm between said ends, said transducer means supported at said first end of said arm centered on said longitudinal axis on a gimble mounted on one end of a flexure, said flexure being a straight arm load-beam extending from an attachment point of said flexure to said arm located between said pivot and said arm first end and having a shape in a plane parallel to said disc surface which is substantially symmetrically tapered about said longitudinal axis from a wide portion proximate said first end to a narrow portion proximate said transducer means; and a load spring secured to an end of said straight arm load-beam and a gimble spring secured to the load spring for supporting the transducer;

a voice coil motor comprising a single magnet supported at said second end, said magnet being selectively positionable by activation of two voice coils; and a housing comprising a top portion having a roof portion and side walls mating with a base portion to define a cavity enclosing said at least one hard disc, said means for rotatably supporting said hard disc, means for rotating said hard disc, said transducer means, and said positioning means; said housing having one of said positioning means voice coils mounted to said base portion and the other of said voice coils mounted to said roof portion, the overall dimensions of said housing being substantially 70 mm by substantially 50 mm with a thickness of substantially between 10 mm, said transducer means being selectively positionable over tracks on said disc.

said voice coil motor having a compact design having a reduced thickness in which said first and second coils are mounted directly to the roof and base portions of said housing in which the said or each disc, supporting means, transducer means and positioning means are disposed, and are contained entirely within said housing, so that the overall external thickness of said housing in a direction parallel to said pivot in the region containing said voice coil motor is substantially the combined thicknesses of only said coils, said magnet. said housing roof said housing base, and air gaps between said coils and said magnet.

4. A disc drive as claimed in claim 3 including an external connector on the upright sidewall of said housing adjacent said voice coil motor, and a second electronic connector on outer portion of the base of said housing extending underneath said voice coil motor, said external upright connector on said upright sidewall permitting the disc drive to be easily inserted and withdrawn from a computer in which the disc drive is to be used.

5. A disc drive comprising:

at least one hard disc;

supporting means for supporting the or each hard disc and for rotating the or each hard disc at a constant speed;

transducer means for writing to and reading from digital information from the or each hard disc;

positioning means for selectively positioning the or each transducer means with respect to a respective disc, said positioning means comprising an actuator arm rotatable about a pivot having said transducer means on one side of the pivot and a voice coil motor on the other side of the pivot, said voice coil motor having a rotor and stators; characterized in that said voice coil motor has a compact design having reduced thickness in which said stators are mounted directly to the ceiling and base of a housing in which the said or each disc, supporting means, transducer means and positioning means are disposed, and are contained entirely within said housing, so that the overall external thickness of said housing in a direction parallel to said pivot in the region containing said voice coil motor is substantially the combined thicknesses of only said stators, said rotor, said housing ceiling, said housing base, and air gaps between said stators and said rotor.

6. A disc drive as claimed in claim 5, in which said rotor comprises a single selectively energized coil and said stators comprise first and second magnets.

7. A disc drive as claimed in claim 6, in which said at least one hard disc is a single disc, and wherein the combined thicknesses of said stators, said rotor, said housing ceiling, said housing base, and air gaps between said stators and said rotor is substantially 10 mm.

8. A disc drive as claimed in claim 7, in which said housing base and ceiling are substantially planar and wherein said housing base and said housing ceiling each have substantially constant thickness in the region occupied by said voice coil motor.

9. A disc drive as claimed in claim 7, in which said combined thicknesses of said stator, said rotor, said housing ceiling, said housing base, and air gaps between said stator and said rotor between substantially 10 mm and substantially 19 mm; and in which said positioning means further includes at least one flexure said or each coupled to a respective transducer means and means for lifting said or each transducer means from the disc; and wherein said lifting means comprises a shape memory metal element extending along the flexure and attached thereto, attached to said actuator arm and being responsive to the application of current so as to change its state and bend the flexure thereby lifting the transducer means.

10. A disc drive as claimed in claim 9, further comprising a transducer rest area located at the side of the or each disc and said positioning means moves the or each transducer means to said rest area when said disc drive is not in use.

11. A disc drive as claimed in claim 10, in which said positioning means further includes at least one flexure each coupled to a respective transducer means, wherein said flexure is a 70 percent (micro) flexure/gimbal/suspension, and wherein the or each disc has an outer diameter sized to fit within a housing having dimensions of substantially 70 mm long by substantially 50 mm wide.

12. A disc drive as claimed in claim 9, wherein said flexure is a straight arm load-beam extending from an attachment point at a pivot toward said transducer and having a shape in a plane parallel to said disc surface which is substantially symmetrically tapered from a wide portion proximate said pivot to a narrow portion proximate said transducer.

13. A disc drive as claimed in claim 6, in which said rotor comprises a magnet and said stators comprise first and second voice coils.

14. A disc drive as claimed in claim 13, in which said combined thicknesses of said stators, said rotor, said hosing ceiling, said housing base, and air gaps between said stators and said rotor is between substantially 10 mm and substantially 19 mm such that said housing has a maximum thickness of between substantially 10 mm and substantially 19 mm in a region of said disc drive containing said voice coil motor.

15. A disc drive as claimed in claim 14, in which said housing base and ceiling are substantially planar and wherein said housing base and said housing ceiling each have substantially constant thickness in the region occupied by said voice coil motor.

16. A disc drive as claimed in claim 5, in which said housing includes at least one connector for coupling said disc drive to a computer.

17. A disc drive as claimed in claim 16, in which said connector extends from said housing proximate the voice motor in order to minimize the electrical path from said transducer to said computer.

18. A disc drive as claimed in claim 17, further comprising a pre-amplifier coupled to said transducer means and at least one connector.

19. A disc drive as claimed in claim 5, in which said positioning means further includes at least one flexure coupled to a respective transducer means, and means for lifting each transducer means from the disc.

20. A disc drive as claimed in claim 19, in which said lifting means comprises a ridge extending the length of said flexure functioning as a cam co-operating with a ramp located at the side of the or each disc so as to lift the associated transducer as the transducer is moved to the side of the respective disc.

* * * * *